March 12, 1940. H. G. THOMSON 2,193,261
APPARATUS FOR EFFECTING THE SEPARATION OF COMMINGLED LIQUIDS
Filed Aug. 10, 1936
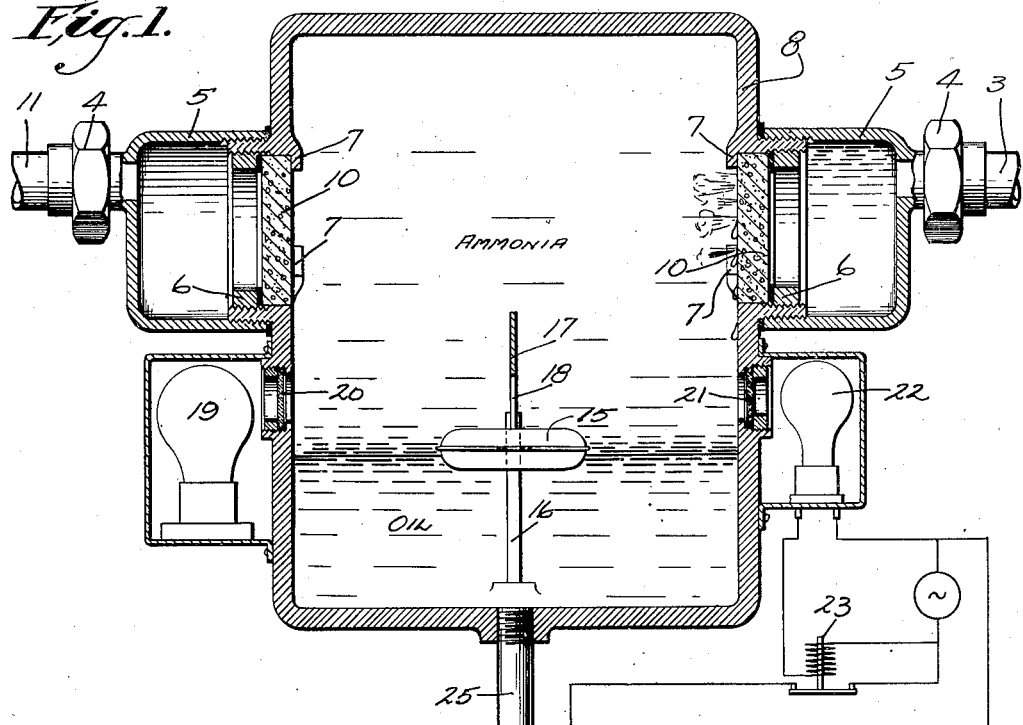
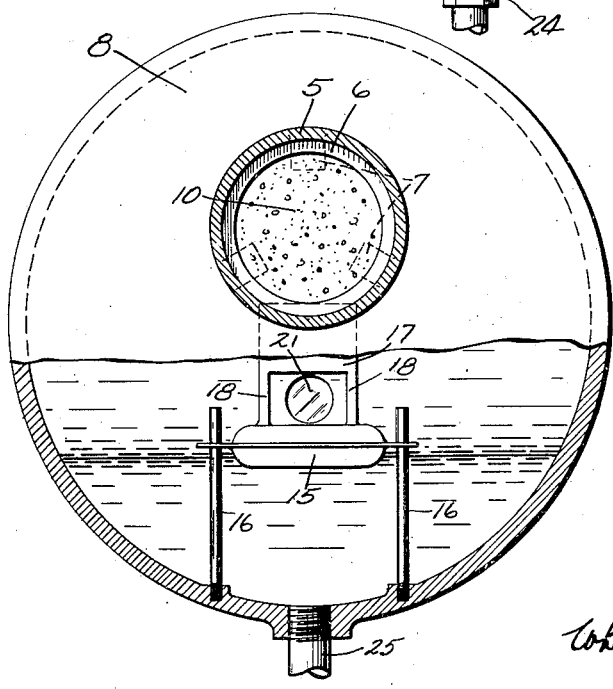
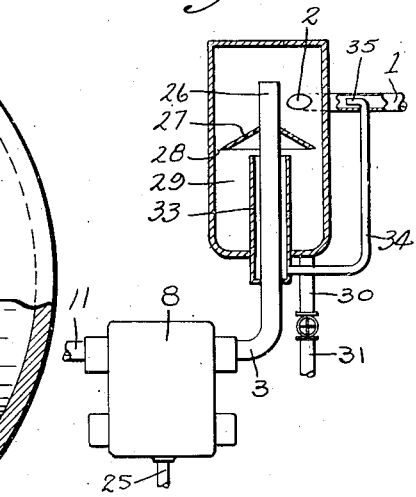
INVENTOR
Homer G. Thomson
BY
Wheeler, Wheeler & Wheeler
ATTORNEYS Patented Mar. 12, 1940

2,193,261

UNITED STATES PATENT OFFICE 2,193,261

APPARATUS FOR EFFECTING THE SEPARATION OF COMMINGLED LIQUIDS

Homer G. Thomson, Milwaukee, Wis.,

Application August 10, 1936, Serial No. 95,190

5 Claims. (Cl. 210—54)

This invention relates to improvements in apparatus for effecting the separation of commingled liquids.

Broadly speaking, it is the object of the invention to provide a novel, improved, simple and inexpensive means of separating liquids of certain characteristics. The invention has a specific application, illustrative of its objectives, in separating lubricating oil from ammonia in plants used for refrigeration. Oil from the compressor has long been the cause of inefficient operation of refrigerating plants. Even a fine spray of oil, entrained in the output line of liquid ammonia, will ultimately coagulate and adhere to the pipes, particularly in the cold part of the system, following expansion of the ammonia. Here it greatly interferes with heat transfer and finally obstructs the pipe to such an extent as to require the shut down of the entire system and the cleaning of the pipes and equipment with steam to remove the accumulated oil.

The present invention employs a simple principle in a novel way to effect the complete separation of the oil from the ammonia in a trap from which the oil may be drained in liquid form, as distinguished from the frothy condition in which oil appears in traps which the art is now trying to employ, with indifferent success, to separate oil.

In the drawing:

Figure 1 is a vertical axial cross section through a separating trap in which liquids are separated in accordance with the present invention, the trap optionally including a device for automatically effecting the drainage of the oil from time to time as it accumulates.

Figure 2 is a view of the trap shown in Figure 1 as it appears partially in end elevation and partially in section.

Figure 3 is a view in vertical section through a centrifugal separator which may be used in advance of the viscosity separator to protect the ceramic block used in effecting viscosity separation.

Like parts are identified by the same reference characters throughout the several views.

The commingled liquids to be separated arrive at the device through the pipe 3. A coupling 4 connects this pipe with a housing 5 which is of sufficient cross section to materially retard the rate of flow and is made removable to give access to a clamping ring 6 which holds against the lugs 7 of chamber 8 a porous ceramic block 10.

This structure may conveniently be duplicated at the discharge side of chamber 8 whence the lighter of the two liquids is discharged through pipe 11. Separation, however, is complete when the liquids have passed through the ceramic block 10 at the inlet.

The principle upon which separation is effected will now be explained.

The invention is peculiarly fitted for use where one of the two liquids involved is not merely lighter, but less viscous than the other. This is the case with oil and liquid ammonia, the oil having relatively high viscosity and having a specific gravity of approximately .8 as compared with a specific gravity of approximately .5 for ammonia. Using these two liquids for purposes of illustration, the operation is as follows:

The velocity through the pipe 3 may be comparatively high. In a test installation it was as much as 1200 feet a minute. That velocity is, however, greatly reduced in the housing 5, due to the increased cross section.

The block 10 is a coarse grade of filter block commercially available and made to have a substantially uniform porosity due to the interstices between the uniformly sized or graded particles of alundum or other grains which are bonded together to make up the ceramic block. The block used in practice somewhat resembles an emery wheel in appearance but it is sufficiently open and porous so that water will flow through it almost unimpeded. The reduction in pressure in the ammonia line due to the presence of two successive blocks in the apparatus disclosed was so slight as to be negligible. While the block is one which is developed for use as a filter, it does not serve a filter function in this apparatus, since both of the liquids to be separated must pass through the block.

Due to the viscosity of the oil, the oil will wet the surface of the ceramic block and adhere to the material thereof to a very markedly high degree as compared with the ammonia. Therefore, when the two liquids issue from the pores of the face of the block which is presented to the interior of chamber 8, the adhesion of the oil to the block will cause the oil to tend to flow by gravity downwardly and from the face of the block on to the surfaces of chamber 8. If the oil were lighter than the liquid from which it requires separation it would tend, conversely, to be forced by displacement to flow upwardly over these surfaces to the top of the chamber. In either case the viscosity of the oil, as compared with the other liquid, affords an opportunity for the forces of displacement to have their effect in maintaining the separation which is achieved by reason of the difference in viscosity.

It will be understood that in operation the chamber 8 will be full of liquid. For the two particular liquids taken by way of example the ammonia will occupy the top of the chamber and the oil will occupy the bottom. The ammonia, since it does not wet the ceramic block, will issue from the pores of the block in little sprays or jets, the velocity of which will speedily be absorbed in the mass of liquid in the chamber. The clear ammonia will pass, practically without resistance, through the block 10 disposed in the outlet, although this block may be of a finer grade, with smaller pores, due to the absence of the oil. Its function in the apparatus is primarily as a baffle to maintain a low velocity and prevent the establishment of currents in chamber 8.

The oil accumulated in the bottom of chamber 8 may be drawn off from time to time by hand if desired. It is also possible to control the delivery of the oil automatically. The difference in specific gravity of the two liquids is sufficient to permit the use of a float 15 which is guided on rods 16 and carries an opaque plate 17 upon standards 18, the space between the standards and beneath the plate being open as shown in Fig. 2.

The light of a lamp 19 on one side of the apparatus penetrates chamber 8 through a window at 20 and, when the oil level is low, is intercepted by the plate 17. When the oil level raises the float 15 to the position shown in the drawing, the light passes through the opening between the standards 18 to a second and opposite window 21 where through it reaches a photoelectric cell 22 which is connected through a suitable relay 23 to open a magnetic valve 24. The valve will remain open until the oil level is sufficiently reduced to cut off the light to the photoelectric cell, whereupon the circuit will be interrupted and the valve will close in the usual manner.

The use of a plate, supported well above the float 15, protects the windows 20 and 21 from becoming soiled by the oil. The arrangement is such that the photoelectric cell operates before the oil reaches the level of the window. The ammonia does not discolor the glass or interfere with the transmission of light therethrough.

While I have used oil and ammonia as examples of liquids which may be separated by the improved apparatus and process herein disclosed, it will be obvious that any other liquids characterized by a difference in viscosity and a difference in specific gravity are likewise subject to separation.

If, for example, it is desired to separate water from an oil line, the viscosity of the oil will cause it to cling to the ceramic block 10 in the manner above described, and it will be displaced upwardly by the water so that the water will fill the bottom of the chamber and the oil the top. In such a case the oil would flow outwardly through pipe 11 and the water would be withdrawn from the pipe 25. In that case it would be desirable to reverse the position of the plate 17 with respect to the float, but otherwise the apparatus and process would function as described.

While the apparatus and process are believed to involve a relative difference in viscosity of the two liquids to be separated, it is nevertheless a probability that the nature of the block 10 is an important factor which may even achieve the separation of liquids of like viscosity but different gravity. It seems to be important that the commingled or emulsified liquids to be separated be passed for a substantial distance through a solid (and preferably a ceramic) block, the pores of which are sufficiently fine to minutely subdivide the stream of liquid, and the area of which is sufficiently great so that the finely subdivided portions of the stream will not move with undue velocity.

In the finely divided streams, the particles of liquid which have been entrained in a larger body of liquid, and thus maintained in suspension or emulsion, have only just sufficient room to pass and thus are effectively separated from the body of liquid previously surrounding them. In the prolonged passage through the interstices of the ceramic block these particles tend to unite with other particles and in the settling chamber there is no force tending to re-emulsify the mixture. Certainly the oil in this apparatus is in a smooth homogeneous condition very different from the frothy foamy state of oil in a settling chamber in an ammonia line which does not have the ceramic block to bring the oil particles together.

In many installations the successful operation of the device may depend on means for preventing the ceramic separating block 10 from functioning as a filter and becoming clogged with foreign solids. This is particularly true of refrigerating system installations, the average ammonia being extremely dirty.

Where foreign solids are present, I prefer to use in advance of the separating device herein disclosed a centrifugal separator of the general character shown in Fig. 3, which is inserted in the ammonia line ahead of the viscosity separator above described.

The ammonia with entrained solid and liquid foreign matter arrives through the pipe 1 and is delivered through a tangential or substantially tangential orifice 2 into the cylindrical chamber 25 where it establishes a rapid spinning rotation of the entire body of liquid and foreign matter within the chamber.

The solids are thereby centrifugally expelled to the periphery of the chamber forming a concentrated stratum of annular form along the wall. The outlet pipe 26 is taken from the upper central portion of the chamber and communicates with pipe 3 which leads to the viscosity separator shown in Figs. 1 and 2.

There is a baffle 27, preferably, though not necessarily, of conical form, mounted intermediate the top and bottom of the chamber and peripherally spaced very slightly from the chamber wall to leave a narrow annular slot 28 through which the foreign solids will gradually pass into a sump or settling chamber 29 at the bottom of the tank 25. A discharge pipe 30 controlled by valve 31 provides for the discharge of the concentrated sludge 29 when desired.

To assist gravity in urging the concentrated stratum of solids separated centrifugally in the upper portion of tank 25 to pass downwardly through the slot 28 into the settling chamber, I prefer to establish a slow flow of liquid in a downward direction in tank 25. If the liquid is not valuable this may be accomplished by simply leaving valve 31 slightly open so that the constant withdrawal from the lower portion of the tank will cause a constant helical downward movement of the material in the concentrated stratum centrifugally separated as aforesaid. If the material is valuable much the same result may be effected by the addition of a second withdrawal pipe 33 concentric with pipe 26 and preferably opening immediately beneath the baffle 27 to withdraw from the settling chamber those liquids which are least concentrated. From pipe 33 a small pipe 34 leads back to an aspirating terminus 35 in the supply pipe 1 whereby such portion of the liquid as is withdrawn from the settling chamber is recirculated and again subjected to the centrifugal action of the whirling mass in the upper portion of tank 25.

The centrifugal separation effected in the device shown in Fig. 3 will take care not only of solids but of heavy liquids which are not in emulsion with the principal liquid of the system. Thus much of the oil in a refrigerating system may be present in the form of well-defined drops or globules and these will be centrifugally separated from the ammonia liquid and will find their way into the sump 29 from which they may be withdrawn with the concentrated solids. The finely divided oil in colloidal form or in emulsion with the ammonia will, however, have to be removed by the ceramic block 10 at the inlet to chamber 8.

I claim:

1. In a device of the character described, the combination with a chamber provided with a drain and light transmitting means, of a valve for said drain, means including a light actuated device for the control of said valve, and means including a light intercepting float between said light transmitting means and said light actuated device whereby the depth of a material in said chamber controls the operation of said light actuated device.

2. In a device of the character described, the combination with a windowed chamber having a valve controlled drain, of a float within the chamber including a screen adapted to intercept light passing through the chamber, and a light sensitive means controlled by the light passed by said screen for regulating the operation of said valve.

3. In a device of the character described, the combination with a settling chamber having an admission port, of a porous ceramic block applied to said chamber at said port and adapted to effect the separation of liquids of differing gravity and viscosity entering said chamber, a drain leading from the bottom of said chamber for one of said liquids, an outlet leading from the upper portion of said chamber for the other of said liquids, a float operable upon the difference in specific gravity between said liquids, a valve controlling said drain, and float operated means for regulating the operation of said valve, said means comprising photosensitive mechanism.

4. In a device of the character described, the combination with a settling chamber having an admission port, of a porous ceramic block applied to said chamber at said port to extend to different levers thereof and adapted to effect the separation of liquids of differing gravity and viscosity entering said chamber, a drain leading from the bottom of said chamber for one of said liquids, an outlet leading from the upper portion of said chamber for the other of said liquids, a float operable upon the difference in specific gravity between said liquids, a valve controlling said drain, and float operated means for regulating the operation of said valve, said means comprising a screen carried by said float, a source of light, a light sensitive device in the path of light controlled by said screen and emanating from said source, and electrical means including said light sensitive device for the actuation of said valve.

5. In a refrigerating system, the combination with an ammonia supply line, of a chamber with which said line communicates substantially tangentially to effect a whirling of liquids and solids in the chamber for the centrifugal separation of the solids therefrom, means centrally disposed in the chamber for withdrawing liquids therefrom, a porous block having an enclosing housing with which said means communicates for the viscosity separation from the ammonia of liquids emulsified therewith, a separating chamber having a substantially upright wall with an opening in the upper part thereof in which said block is disposed for discharge into the separating chamber and outlets at different levels in the separating chamber for withdrawing therefrom the ammonia and other liquids which have been separated therefrom in passing through said block, the outlet for ammonia being in the upper part of the separating chamber and the other outlet comprising means for maintaining said other liquid below the effective level of said block.

HOMER G. THOMSON.

CERTIFICATE OF CORRECTION.

Patent No. 2,193,261. March 12, 1940.

HOMER G. THOMSON.

It is hereby certified that error appears in the printed specification of the above numbered patent requiring correction as follows: Page 3, second column, line 12, claim 4, for the word "levers" read levels; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.